(12) United States Patent
Yamada et al.

(10) Patent No.: US 7,609,714 B2
(45) Date of Patent: Oct. 27, 2009

(54) PROGRAMMABLE CONTROLLER AND DUPLEXED NETWORK SYSTEM

(75) Inventors: Hiroaki Yamada, Yokohama (JP); Hideo Okeda, Mishima (JP); Kenichiro Tomita, Kannami (JP); Makoto Ishikawa, Mishima (JP)

(73) Assignee: OMRON Corporation, Kyoto (JP)

( * ) Notice: Subject to any disclaimer, the term of this patent is extended or adjusted under 35 U.S.C. 154(b) by 936 days.

(21) Appl. No.: 10/943,490

(22) Filed: Sep. 17, 2004

(65) Prior Publication Data

US 2005/0102556 A1   May 12, 2005

(30) Foreign Application Priority Data

Sep. 18, 2003   (JP)   ............... 2003-326720

(51) Int. Cl.
  *H04L 12/66*   (2006.01)
(52) U.S. Cl. ........................ 370/463; 370/445
(58) Field of Classification Search ............ 370/445, 370/447, 451, 463
  See application file for complete search history.

(56) References Cited

U.S. PATENT DOCUMENTS

| | | | | |
|---|---|---|---|---|
| 4,748,560 | A | * | 5/1988 | Kataoka ............ 710/107 |
| 5,329,528 | A | | 7/1994 | Akai et al. |
| 2002/0089925 | A1 | | 7/2002 | Smith et al. |
| 2002/0179720 | A1 | | 12/2002 | Liva et al. |
| 2002/0196805 | A1 | | 12/2002 | Brocco et al. |

FOREIGN PATENT DOCUMENTS

| | | |
|---|---|---|
| EP | 0 351 757 | 1/1990 |
| JP | 03-296344 | 12/1991 |
| JP | 05-252168 | 9/1993 |
| JP | 08-065331 | 3/1996 |

(Continued)

OTHER PUBLICATIONS

Patent Abstract of Japan Vo. 1999, No. 14, JP 11-252144 (Sep. 17, 1999).

(Continued)

*Primary Examiner*—Jason E Mattis
*Assistant Examiner*—Dady Chery
(74) *Attorney, Agent, or Firm*—Weaver Austin Villenueve & Sampson LLP

(57) ABSTRACT

A duplexed network system is formed with a plurality of programmable controllers and two different networks. Each of the programmable controllers includes a CPU unit, a primary communication unit connected to one of these networks (the first network) and a secondary communication unit connected to the other of the networks (the second network). The primary communication unit serves to compile participation status of nodes connected to the first network. The CPU unit gives priority to the primary communication unit when a request to transmit a communication command is issued to both the primary and secondary communication units. The primary communication unit serves to judge, when a request to transmit a communication command to an addressee node is received from the CPU unit, whether transmission to the addressee node is possible based on the participation status of the first network, to transmit the communication command if the transmission is judged to be possible and to request the secondary communication unit to transmit the communication command if the transmission is judged to be not possible.

6 Claims, 8 Drawing Sheets

FOREIGN PATENT DOCUMENTS

| | | |
|---|---|---|
| JP | 09-186711 | 7/1997 |
| JP | 2001-156801 | 8/2001 |
| JP | 2002-215473 | 8/2002 |

OTHER PUBLICATIONS

European Search Report, Application No. EP04021950, Jan. 7, 2005.

Patent Abstracts of Japan, Publication No. 2001-156818, *Node, Transmission Method, And Communication Unit For PLC*, Yamada Hiroaki et al., published on Aug. 6, 2001.

Japan patent application No. 2003-326720, Examination Report mailed Apr. 18, 2007.

\* cited by examiner

PROGRAMMABLE CONTROLLER AND DUPLEXED NETWORK SYSTEM

Priority is claimed on Japanese Patent Application 2003-326720 filed Sep. 18, 2003.

BACKGROUND OF THE INVENTION

This invention relates to programmable controllers and duplexed network systems. More particularly, the invention relates to duplexing methods for a network connected to a programmable controller.

Programmable controllers are being used as controlling devices for the factory automation set at a production factory (or a production site). Such a programmable controller (PLC) is comprised of a plurality of units, that is, it is formed by appropriately combining units of various types such as a power unit serving as a supply source of electric power, a CPU unit for carrying out the control of the PLC as a whole, an input unit for inputting signals from switches and sensors set at appropriate positions of production device or an equipment of the factory automation, an output unit for transmitting control outputs to actuators and a communication unit for connecting to a communication network.

The control by this CPU unit of a PLC is carried out by taking in signals inputted by the input unit into the I/O memory of the CPU unit (IN refresh), performing logical calculations based on a user program in a preliminarily registered user program language such as a ladder language (calculation), writing the results of the performed calculations in the I/O memory to thereby transmit them to the output unit (OUT refresh) and to thereafter cyclically repeat peripheral processes such as exchanging data with other PLCs on the communication network through the communication unit or with external apparatus through communication ports on the CPU unit. The IN refresh and the OUT refresh may be sometimes carried out summarily (I/O refresh).

As disclosed in Japanese Patent Publication Tokkai 2001-156818, for example, network systems are sometimes doubled, or duplexed, in order to improve system safety and reliability. According to this disclosure, an annular transmission system is formed with an optical cable arranged in an annular form such that nodes such as PLCs connected to this annular transmission route can be maintained in mutually connected conditions even if the transmission route is broken somewhere and hence a breakdown in communication can be prevented. Network reliability can thus be improved.

The PLC is connected to the network through the communication unit (the network unit) and is adapted to exchange data with the other nodes such as PLCs through this communication unit. Thus, interruptions of communication due to a breakage in the transmission line can be prevented by using such a duplexed transmission system with an annular transmission route but there still remains the problem that communication may become impossible for a node (such as a PLC) connected to a network through a communication unit because an abnormality occurs in the communication unit itself.

Still another problem of this prior art system is that it is not applicable to any other network formation because a network formation with an optical cable in an annular form is presupposed. In other words, the networks commonly used currently using wire cables and networks using bus-type wiring cannot be duplexed. Moreover, since an optical cable is used, the cost of the cable becomes greater than if a wire cable is used. Furthermore, even if an optical cable is arranged in an annular form, the network becomes disconnected if a breakage occurs at two or more places and communication can no longer be continued.

SUMMARY OF THE INVENTION

It is therefore an object of this invention to provide a programmable controller and a duplexed network system with which communication can be continued even if a communication unit develops an abnormal condition.

A programmable controller according to this invention comprises a CPU unit, a primary communication unit connected to a network (first network) and a secondary communication unit connected to a different network (second network). The primary communication unit is adapted to compile participation status of nodes connected to the first network to which it is connected. The CPU unit is adapted to give priority to the primary communication unit when a request to transmit a communication command is issued to the primary and secondary communication units. The primary communication unit is also adapted to judge, when a request to transmit a communication command to a certain addressee node is received from the CPU unit, whether transmission to this addressee node is possible based on the participation status of the first network, to transmit the communication command if the transmission is judged to be possible and to request the secondary communication unit to transmit the communication command if the transmission is judged to be not possible. Such a request to the secondary communication unit need not be given through the CPU unit but may be directly communicated from the primary communication unit to the secondary communication unit.

Each communication unit according to this invention is provided with a basic function of carrying out processes for transmitting a transmission command to a specified addressee if such a request is made to it. As the CPU unit makes a request firstly to the primary communication unit, the primary communication unit judges, on the basis of the participation status of the network to which it is connected, whether the requested transmission is possible to the addressee (such as whether it is participating to the network to which it is connected), making the transmission if it is judged possible. Thus, the transmission of the transmission command can be carried out to the addressee node dependably. If the transmission is found to be not possible due, for example, to an abnormal condition of the communication unit of the addressee or a network breakage, the transmission of the transmission command is effected by using the secondary communication unit. Thus, transmission to the addressee node can be effected if the addressee is connected to the secondary communication unit. A duplexed network can thus be formed and this network may take any form such as a ring or a bus form.

The secondary communication unit is preferably adapted to compile participation status of nodes connected to the second network connected to itself, to judge, when the request for the transmission is received, whether the transmission is possible to the addressee node based on the participation status of the second network, to transmit the communication command if the transmission is possible, and to carry out a specified error process if the transmission is not possible.

With the secondary communication unit thus structured, the participation status of nodes connected to the network to which it is also connected is searched and the transmission is effected only if such transmission is found to be possible. Thus, a waste of time by carrying out useless transmission operations and waiting for a response after transmission can be avoided. Moreover, a situation in which transmission cannot be made (for example, because of the non-participation) can be communicated quickly to the CPU unit which made the request and also to the application which made the request to the CPU unit.

The secondary communication unit may also be preferably adapted to communicate participation status of nodes connected to the second network to the primary communication unit and to select a network to use for the transmission when the request is received, based on the participation status of the first network and the participation status of the second network.

With the secondary communication unit thus structured, the primary communication unit becomes capable of judging whether transmission is possible through the secondary communication unit. Thus, when the primary communication unit cannot make the transmission through the network connected to it, it can make a request to make the transmission to the secondary communication unit only if the latter is capable of making such a transmission. Thus, attempts to make a useless request can be avoided.

The CPU unit may be adapted to possess information on whether or not the primary communication unit is in a normal condition and is capable of normal communications and is adapted to issue a request to transmit a communication command to the primary communication unit if the primary communication unit is in a normal condition and to the secondary communication unit if the primary communication unit is not in a normal condition. In the above, not to be in a normal condition means, for example, that the communication unit is in an abnormal condition or is removed, say, for exchanging.

A programmable controller according to this invention may alternatively be characterized as comprising a CPU unit, a primary communication unit connected to a first network and a secondary communication unit connected to a second network different from the first network, the primary communication unit being adapted to compile participation status of nodes connected to the first network, the secondary communication unit being adapted to compile participation status of nodes connected to the second network, the primary communication unit and the secondary communication unit transmitting same data in the CPU unit summarily for datalink transmission, the primary communication unit delivering received datalink data to the CPU unit if the primary communication unit is functioning normally, and the secondary communication unit delivering received datalink data to the CPU unit if the primary communication unit is not functioning normally.

Regarding the above, the secondary communication unit may be adapted to deliver to the CPU unit data received by the secondary communication unit from another node which is participating to the first network but not participating to the second network.

With a programmable controller thus structured, data are transmitted through two different networks by using two communication units although the status of the addressee node connected to the networks is unknown. Thus, when a datalink data transmission is attempted, the possibility of data being delivered to the addressee node is improved. When data are received from another node, on the other hand, such data can be successfully stored in the CPU unit as long as at least either one of the two communication units is in a condition to receive them. Thus, network duplication can be accomplished also for data reception.

A duplexed network system according to this invention is characterized as comprising a plurality of programmable controllers embodying this invention and two networks different from each other, the primary and secondary communications of these programmable controllers being connected to different ones of these two networks. Thus, the networks are duplexed and may be of any type.

In the above, the primary communication units of the plurality of programmable controllers may be all connected to one of the two networks and the secondary communication units may be all connected to the other of the networks. In such a network system, programmable controllers and other types of devices not intended to be duplexed may be connected to the network connected to the primary communication units. In this manner, a network system having both duplexed programmable controllers and programmable controllers that are not duplexed mixed together can be formed.

DETAILED DESCRIPTION OF THE INVENTION

Figure 1:
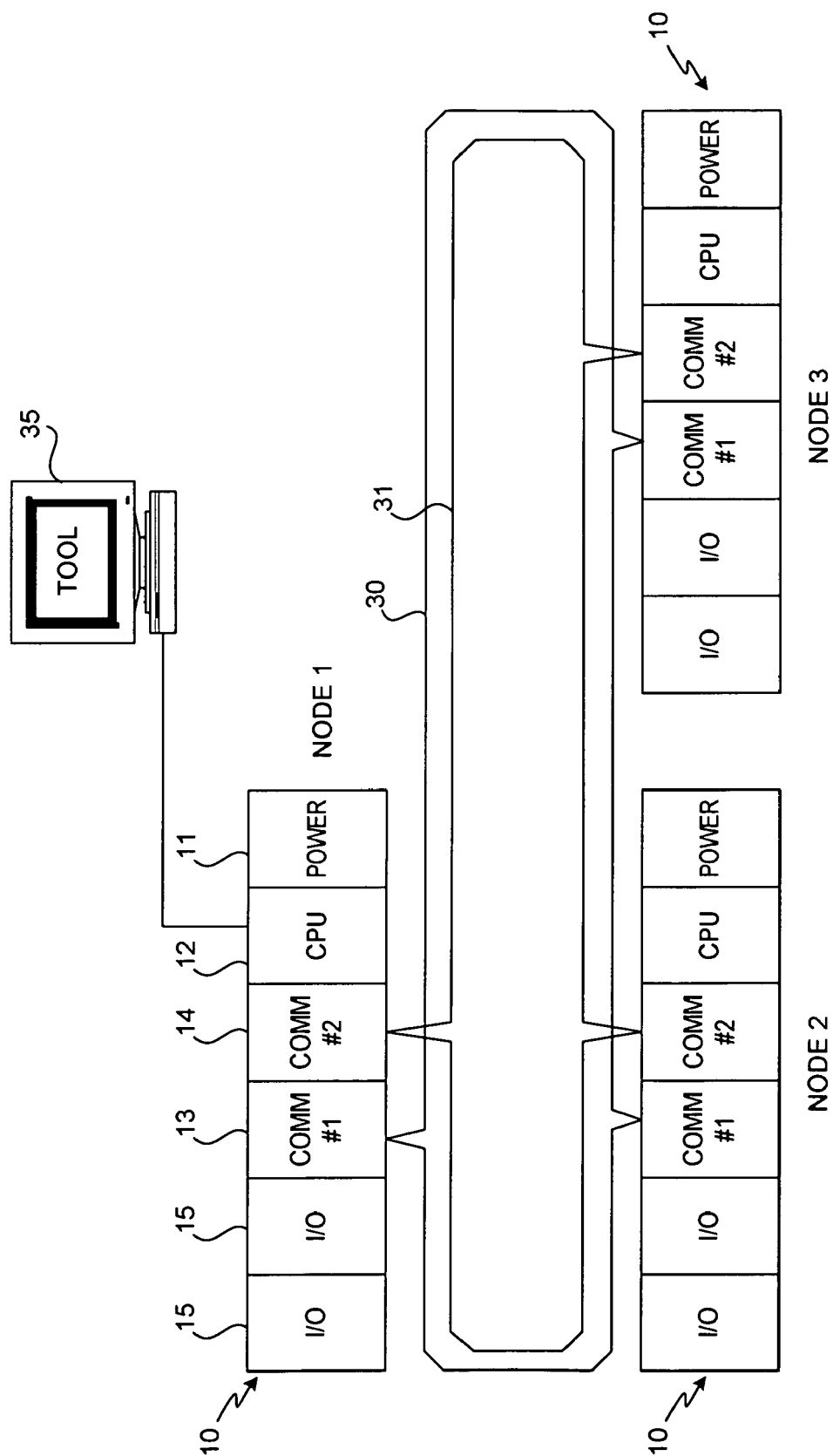
FIG. 1 is a block diagram of an example of network system embodying this invention.

FIG. 1 shows an example of network system formed by using programmable controllers (PLC) 10 embodying this invention connected to a first communication line 30 serving as a primary network and a second communication line 31 serving as a secondary network arranged in an annular form. In other words, the network system according to this invention is characterized as comprising two networks. Although these two networks are arranged in an annular form in the example, they may be arranged in the so-called bus form or in any of other known forms for the arrangement. Cables of various kinds such as optical cables and wire cables may be used for the networks.

The PLCs 10 are each formed with a plurality of units such as a power source unit 11 for supplying electric power to each of the units of the PLC 10, a CPU unit 12 for carrying out a user program and periodically executing the I/O refresh and peripheral processes, two (first and second) communication units 13 and 14 for communicating with other nodes and an I/O unit 15 for connecting input and output devices. These units are connected through a system bus. There are units of other kinds that may also be connected and the number of units to be connected may be increased or decreased if necessary.

Thus, PLCs 10 according to this invention are characterized as comprising two communication units (COMM units) for accomplishing duplication. According to the illustrated example, the first (primary) communication unit (COMM #1)

13 of each PLC 10 connected to the network is connected to the first communication line 30 serving as the primary network and the second (secondary) communication unit (COMM #2) 14 is connected to the second communication line 31 serving as the secondary network. The connections need not necessarily be made in this manner. The first and second communication units 13 and 14 may be mixed on one communication line.

Status data on each of the communication units 13 and 14 and each network (the first and second transmission lines 30 and 31 as well as other nodes connected thereto) are shared among the CPU unit 12 and the first and second communication units 13 and 14 such that it can be determined whether the primary network or the secondary network is to be used for transmitting communication data used in the application such as the user program of the CPU unit. Numeral 35 indicates a personal computer with the function of communicating data on duplication and error conditions to the CPU unit 12.

Figure 2:
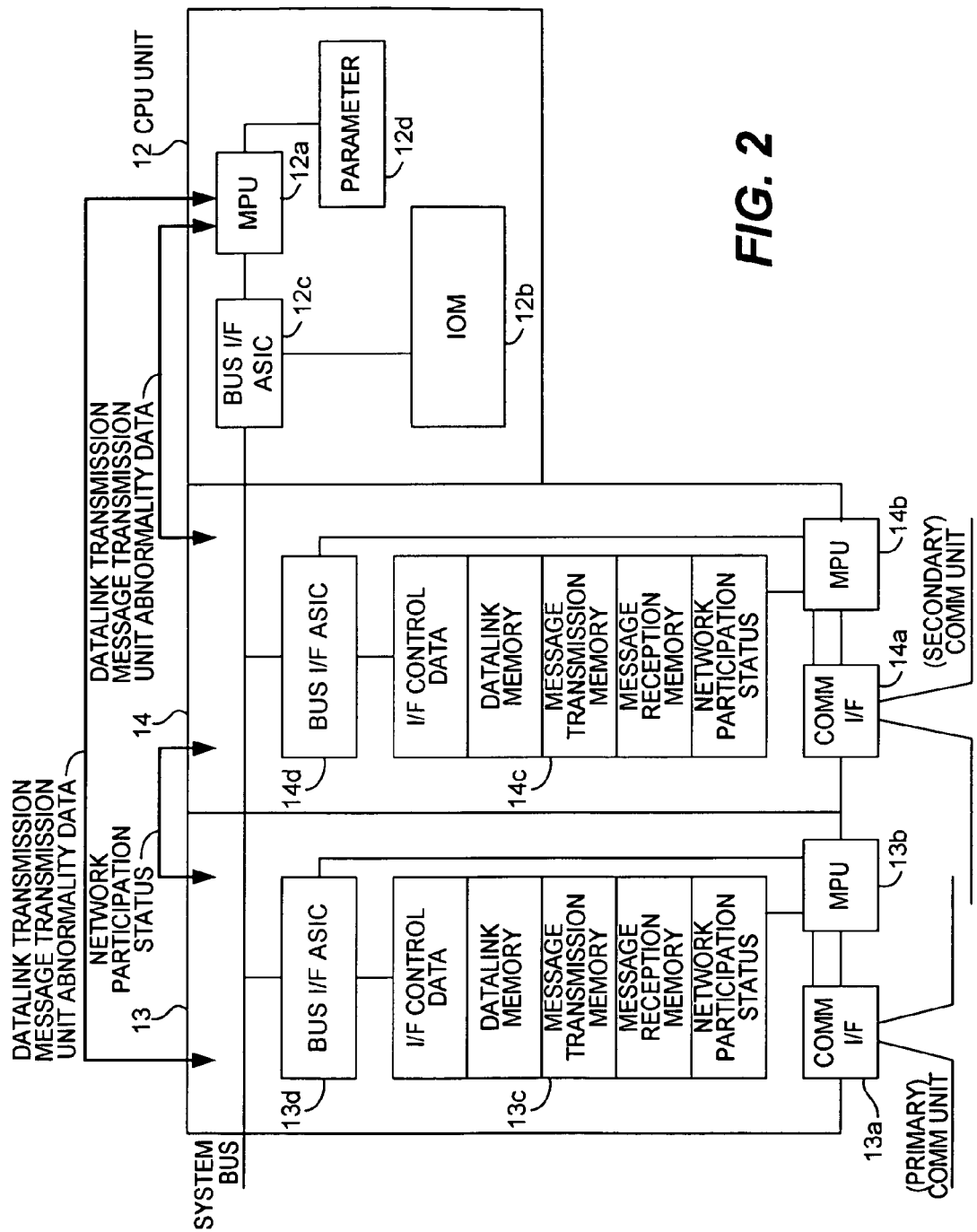
FIG. 2 is a block diagram of a portion of a programmable controller according to this invention.

Next, the internal structures of the CPU unit 12 and the first and second communication units 13 and 14, which are the center parts of this invention, will be explained in detail together with their actual operations. As shown in FIG. 2, the CPU unit 12 is provided with an MPU 12a for carrying out the user program, the I/O refresh and the peripheral processes and an IO memory 12b for storing IO data, etc., connected through a bus interface 12c to a system bus 10a and adapted to exchange data with the other units through this system bus 10a. It is also provided with a parameter memory 12d for recording and storing datalink setting comprising parameters such as memory assignment data required for data-linking. A datalink area is a specified area on the IO memory 12. Since this hardware structure is similar to the prior art, no detailed description will be provided here.

The first and second communication units 13 and 14 are of the same hardware structure. Explained more in detail, each is comprised of a communication interface 13a or 14a connected to the network (the first or second transmission line 30 or 31) to control communications, an MPU 13b or 14b for carrying out various processes, a memory 13c or 14c and an interface ASIC 13d or 14d connected to the system bus for carrying out data exchange.

The memories 13c and 14c each include a message receiving memory area for storing messages received through the communication interface 13a or 14a, a message transmitting memory area for storing transmission messages obtained from the CPU unit 12 through the system bus 10a, a datalink memory area for temporarily storing data to be data-linked, and an area for storing control data of the interface.

The interface control data area stores, for example, assignment data on memory addresses in the memories 13c and 14c and the IO memory 12b for exchanging data. The region for storing data for itself inside the IO memory 12b may be learned through the interface control data.

The functions of the MPUs 13b and 14b will be explained next. When the setting tool of the personal computer 35 is operated to enable the communication duplication setting flag at a specified memory area of the CPU unit 12, the first communication unit 13b (MPU 13b) serving as the primary communication unit carries out the operations of a normal communication unit (such as datalink process and message exchange process) under a normal condition. The first communication unit 13 is further provided with the function of communicating its own communication status (presence or absence of abnormality) to the CPU unit 12, as well as the function of creating a network participation list for the first transmission line 30 by compiling the network participation status showing the network participation status of the nodes connected to the first transmission line 30 and communicating the compilation result (the network participation list) to the second communication unit 14.

The second communication unit 14 serving as the secondary communication unit, on the other hand, operates similarly to an ordinary communication unit with the second transmission line 31 for the exchange of messages. As for the datalink processing, data transmission is effected by reading out data from the CPU unit 12 and transmission is effected into the network summarily but the received data are discarded inside the second communication unit. The second communication unit 14 has also the function of communicating its own communication status (presence or absence of abnormality) to the CPU unit 12, as well as the function of creating a network participation list for the second transmission line 31 by compiling the root differences and the network participation status of the nodes connected to the second transmission line 31 and communicating the compilation result (the network participation list) to the first communication unit 13.

Next, the operations at the time of abnormality will be explained. The types of abnormality considered in this example are as follows:

(1) Occurrence of abnormality in the communication unit itself;
(2) Occurrence of online exchange of communication unit (removal of communication unit while the power source is in the ON condition); and
(3) Occurrence of network abnormality (abnormality in another node and cable breakage).

In cases of (1) and (2) above, the occurrence is communicated to the user as a communication duplexing abnormality. In the case of (3), it is communicated to the user as an ordinary communication abnormality.

Abnormalities in a communication unit include the watchdog timer up (WDTUP) of the communication unit, abnormalities in the transmission part of the communication unit and hardware abnormalities of the communication unit. These abnormalities are recognized from bus interface control data.

An online exchange of a communication unit takes place when the communication unit is exchanged for maintenance inspection or periodic replacement. When an online exchange is carried out on a communication unit (especially on the first communication unit 13 serving as the primary communication unit), the CPU unit 12 comes to recognize that a condition has occurred where a duplexed communication condition cannot be maintained as the user uses a setting tool or the like to communicate to the CPU unit 12 that an online removal is starting. Thus, the CPU unit 12 functions such that what would appear as an bus abnormality if a unit were removed and attached while the power source is in the ON condition will not appear as an bus abnormality when a communication unit is removed and attached.

If a communication unit abnormality or an abnormality based on an online exchange has taken place on the side of the first communication unit 13, message exchanges specified through the primary network from the CPU unit 12 are carried out through the second communication unit 14 and data exchanges through datalink transmission are carried out completely by the second communication unit 14. In the case of the illustrated example, since data transmission can be normally carried out if the first communication units 13 and the first transmission line 30 are in normal conditions, there is no switching operation for data exchanges and data-linking even if an abnormality has occurred on the side of the second communication units 14 or the second transmission line 31 and message transmissions and data-linking are carried out by using the first communication units 13 and the first transmission line 30.

Figure 3:
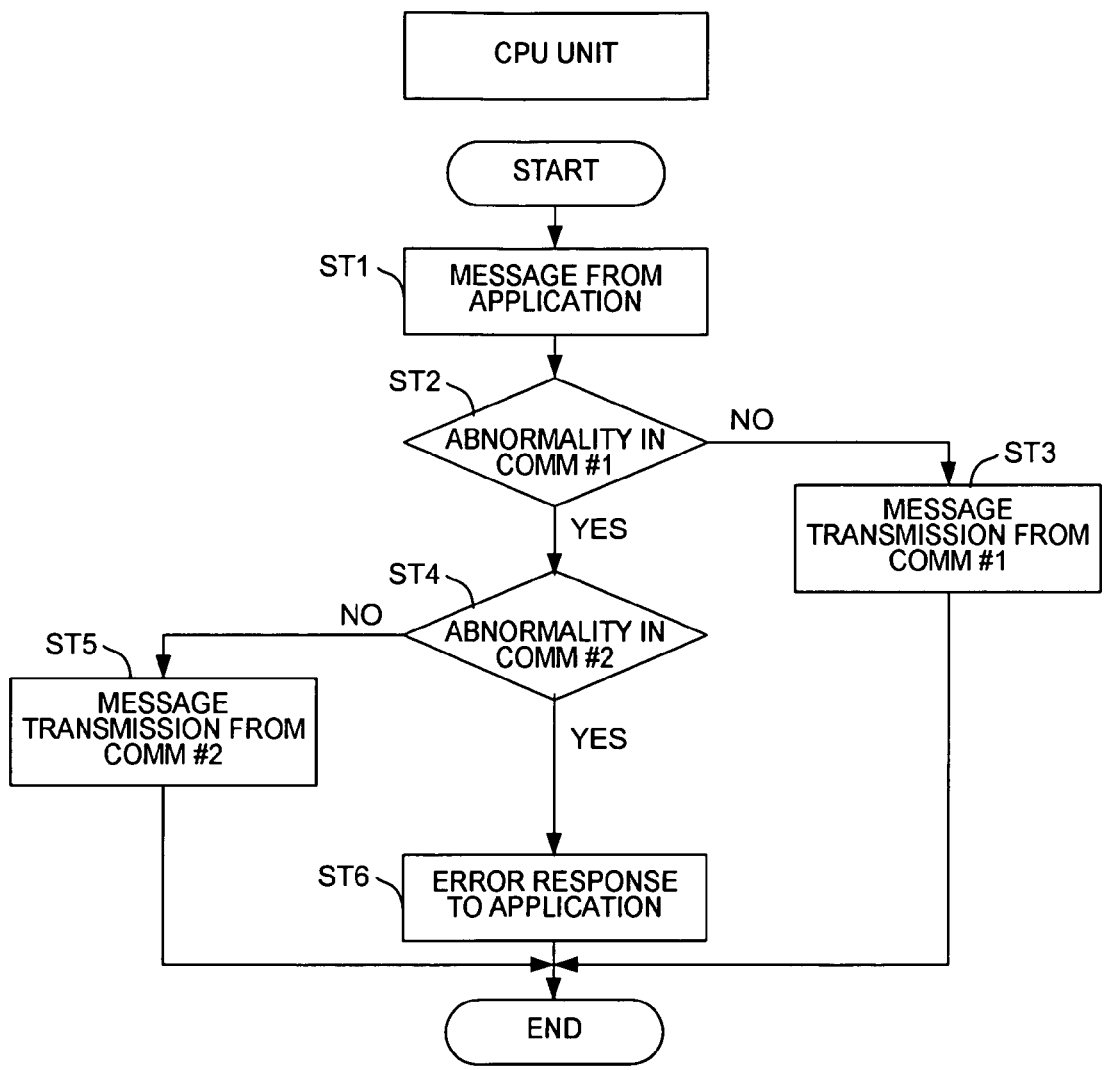
FIG. 3 is a flowchart of the functions of the communication units for message transmission in the case of a communication unit abnormality, etc.

For carrying out the message transmission process described above, the process algorithm of the CPU unit 12 has the function of carrying out the flowchart shown in FIG. 3.

As shown in FIG. 3, as a request is received from an application for message transmission (Step ST1), it is examined whether or not there is an abnormality, etc. in the primary communication unit (the first communication unit 13) (Step ST2). In the above, "abnormality, etc." means an abnormality in the first communication unit 13 and an online exchange. Since the CPU unit 12 keeps receiving the communication status from the first communication unit 13, presence and absence of an abnormality can be judged from such data. At the time of an online exchange, too, since this is communicated to the CPU unit 12, as explained above, it can be judged whether an online exchange is currently being carried out or not.

If there is no abnormality (NO in Step ST2), a message is transmitted to the first communication unit 13 to request for the transmission of a message from the primary communication unit (the first communication unit 13) (Step ST3). The processes in Steps ST1-ST3 are operations by the CPU unit 12 under the normal conditions of the first communication unit 13.

In the case of an abnormality in the first communication unit 13 (YES in Step ST2), it is checked whether there is an abnormality, etc. (a unit abnormality or an online exchange) in the secondary communication unit (the second communication unit 14) (Step ST4). If there is no abnormality (NO in Step ST4), a message is transmitted to the second communication unit 14 such that messages will be transmitted through the second communication unit 14 (Step ST5). Since the second communication unit 14 is in normal condition, messages received from the CPU unit 12 are thereby transmitted to the specified addresses. If the second communication unit 14 is also in an abnormal condition (YES in Step ST4), an error response is returned to the application (Step ST6) since the communication process cannot be carried out.

As for the datalink processes, normal datalink processes are carried out if the first communication unit 13 is in the normal condition. In the case of an abnormality in the communication unit or an online exchange, since the data exchange processes become impossible to perform, it is the same as an ordinary conventional communication unit for datalink processes and hence no detailed explanation will be presented here.

Figure 4:
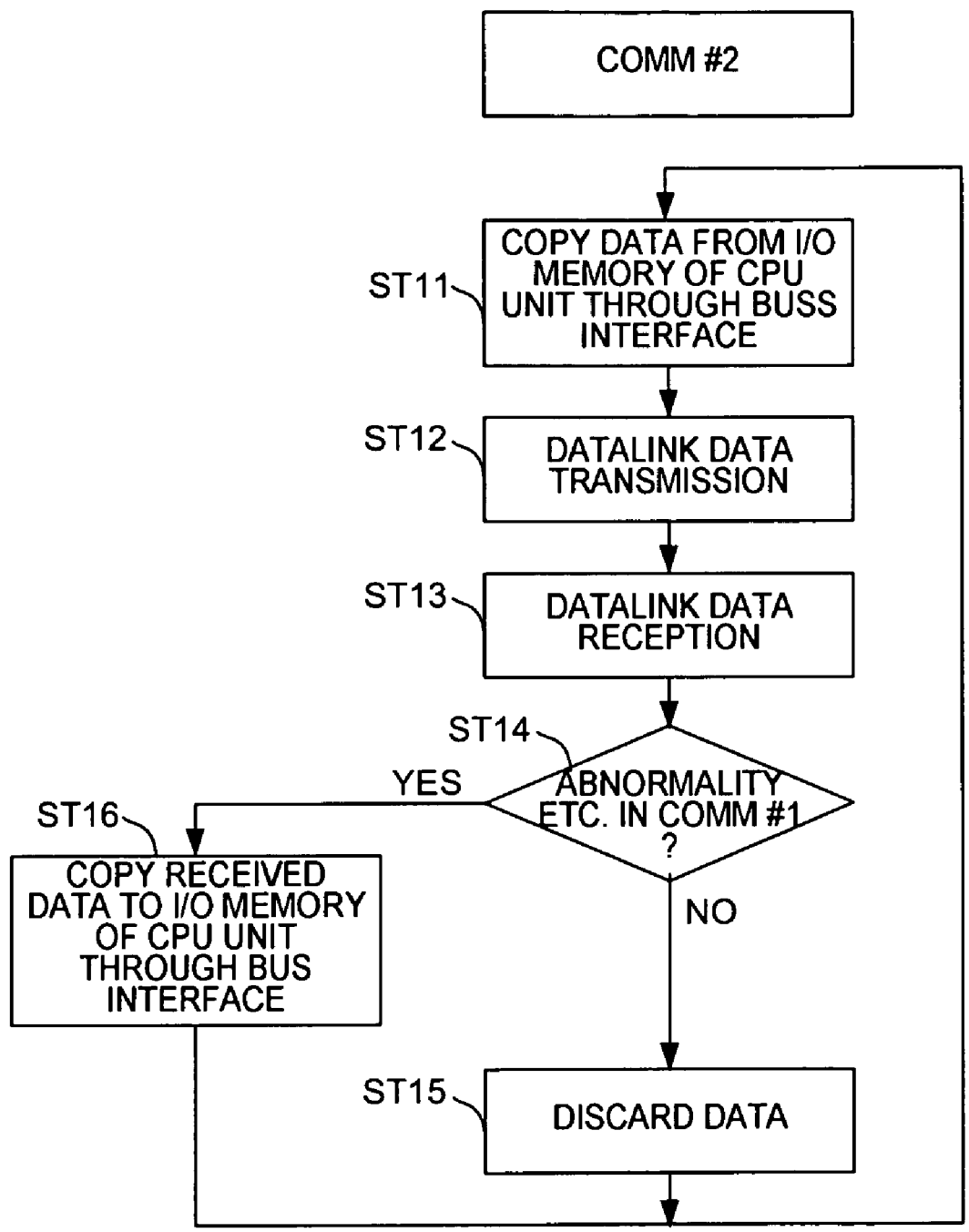
FIG. 4 is a flowchart of the function of the second communication unit as a secondary communication unit for message transmission in the case of a communication unit abnormality, etc.

The second communication unit 14 is provided with an algorithm for carrying out the flowchart of FIG. 4 since it is required to take the place of the first communication unit 13 in case of an abnormality in the latter and to write into the memory in the CPU unit 12 by a datalink process.

In this algorithm shown in FIG. 4, transmission data are initially extracted through the bus interface from an area in the CPU unit 12 assigned for datalink (Step ST11) and datalink transmission is carried out to the second transmission line 31 (Step ST12). If the first communication unit 13 is also under a normal condition, datalink data are also transmitted thereto. In other words, if both the first and second communication units 13 and 14 are functioning normally, the same datalink data are being received by the other nodes through both the first and second transmission lines 30 and 31. Thus, each of such other nodes can receive the transmitted datalink data as long as at least either one of the communication units 13 and 14 is functioning normally and write them on the IO memory of its CPU unit. In other words, although the conditions on the receiving sides (nodes) are not known to the transmitting side, datalink data can be delivered to the other sides by transmitting the same datalink data from both the first and second communication units 13 and 14.

Next, datalink data transmitted from the second communication unit 14 of another node through the second transmission line 31 are received (Step ST13) and the presence or absence of abnormalities, etc. (abnormalities and online exchange) in the first (primary) communication unit 13 is checked (Step ST14). This can be done because both the first and second communication units 13 and 14 are provided with the function of communication to the other of its own abnormal condition.

If the first communication unit 13 is in the normal condition (NO in Step ST14), the data are discarded (Step ST15) and the algorithm returns to Step ST11 to transmit or receive the next datalink data. In other words, if the first communication unit 13 is normal, since the same datalink data are being received also thereby and stored on the IO memory of the CPU unit 12, the received data may be discarded by the second communication unit 14.

If there is an abnormality, etc. in the first communication unit 13 (YES in Step ST14), the second communication unit 14 undertakes to copy the received datalink data on a specified area of the IO memory 12b of the CPU unit 12 through the bus interface (Step ST16). The algorithm returns to Step ST11 thereafter to process the next datalink data.

In summary, it is the same as the prior art if the first communication unit 13 is functioning normally because datalink processes can be normally carried out by using the normal first communication unit 13. If the first communication unit 13 fails to function normally, however, the second communication unit 14 is adapted to carry out the datalink processes according to the invention and hence the datalink process can be effected as long as at least either one of the first and second communication units 13 and 14 is functioning normally.

Figure 5:
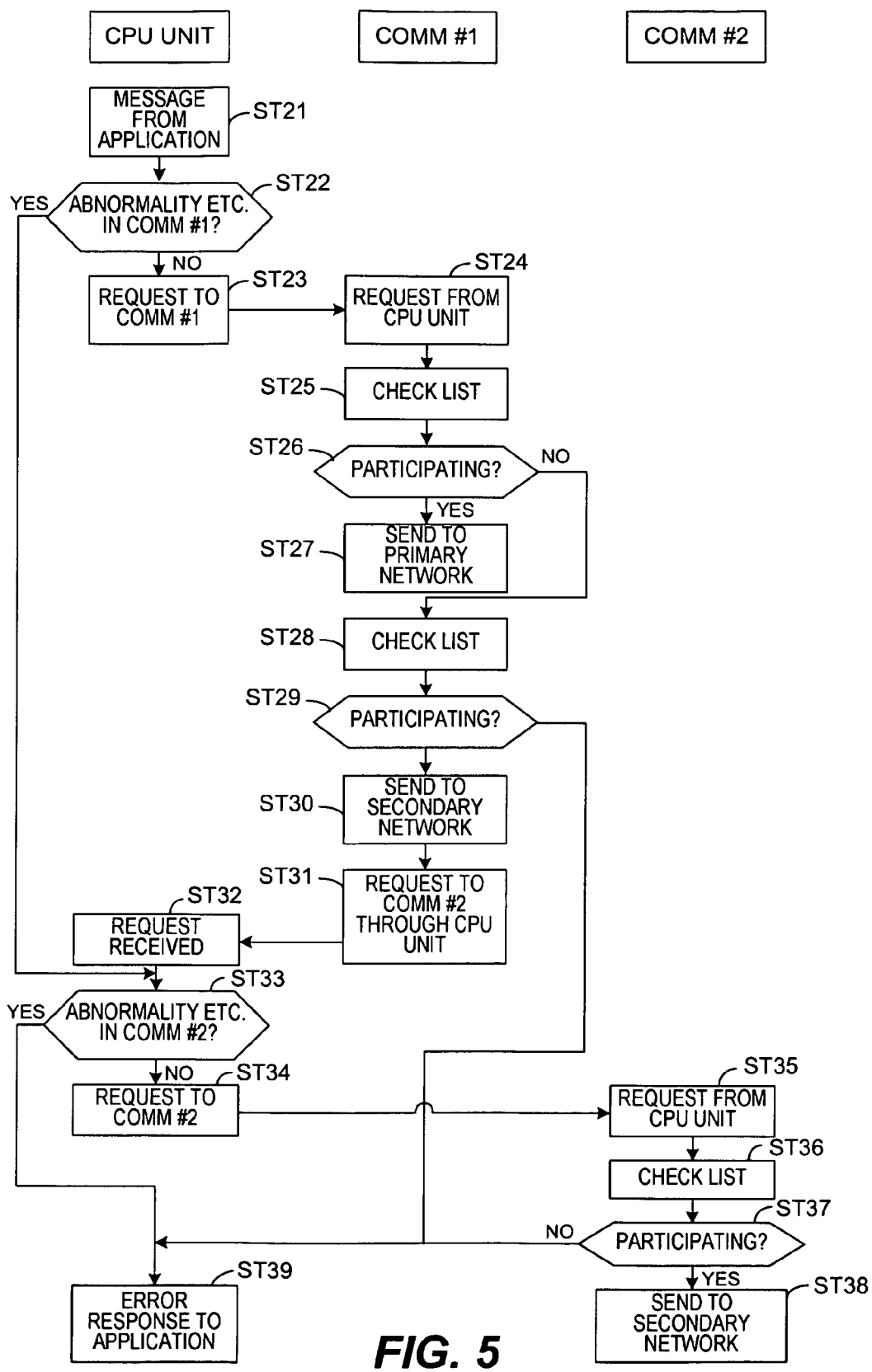
FIG. 5 is a flowchart of the function of each unit for message transmission in the case of a network abnormality.

Next, the operations at the occurrence of a network abnormality (abnormality at another node, cable breakage, etc.) will be explained. The message transmission process is carried out as shown by the flowchart of FIG. 5. As the CPU unit 12 receives a request for data transmission (Step ST21), it is checked whether there is an abnormality, etc. in the first (primary) communication unit 13 (step ST22). If there is no abnormality, etc. (NO in Step ST22), a message to be transmitted is delivered to the first communication unit 13 and a request for message transmission is made (Step ST23). The above is the same as the processes explained above with reference to FIG. 3.

As this request is received from the CPU unit 12 (Step ST24), the first communication unit 13 checks the network participation list on the primary side (the first transmission line 30) (Step ST25) and it is determined whether the addressee (another node) of the requested message is participating to the network of the first transmission line 30 (Step ST26). This judgment may be made from the network participation status of the first transmission line 30 compiled by the first communication unit 13. If it is determined to be participating (YES in Step ST26), the transmission of the message is carried out by the first communication unit 13 by using the primary network (that is, the first transmission line 30) (Step ST27).

If the message addressee is in the disconnected condition from the network of the first transmission line 30 (NO in Step ST26), the first communication unit 13 checks the network participation status of the secondary network (the second transmission line 31) communicated from the secondary communication unit (the second communication unit 14) (Step ST28) to check whether the addressee is participating or not (Step ST29). If the message addressee is also removed from (not participating to) the secondary network on the side of the second transmission line 31 (NO in Step ST29), an error response is delivered to the application which requested the transmission of the message (Step ST39) since the message cannot be transmitted.

If the message addressee is in the participating condition on the side of the secondary network of the second transmission line 31 (YES in Step ST29), the first communication unit 13 decides to carry out the transmission through the second communication unit 14 (Step ST30) and makes a request to the CPU unit 12 that the transmission be made from the second communication unit 14 (Step ST31).

As this request is received from the first communication unit 13 (Step ST32), the CPU unit 12 determines whether or not there is an abnormality, etc. (an abnormality or an online exchange) in the second communication unit 14 (Step ST33). If there is no abnormality, etc. in the second communication unit 14 (NO in Step ST33), it is decided to transmit the message from the second communication unit 14, delivers to the second communication unit 14 the message to be transmitted and requests the second communication unit 14 to transmit the message (Step ST34).

As this request is received from the CPU unit 12 (Step ST35), the secondary (second) communication unit 14 checks the network participation list on the secondary side (on the side of the second transmission line 31) (Step ST36) and thereby determines whether the addressee (another node) of the requested message is participating to the network of the second transmission line 31 (Step ST37). Such a judgment may be made on the basis of the network participation status condition of the second transmission line 31 compiled by the second communication unit 14. If it is participating (YES in Step ST37), the second communication unit 14 carries out the message transmission by using the secondary network (the secondary transmission line 31) (Step ST38).

If it is not participating (NO in Step ST37), an error response is given to the application (Step ST39). If there is an abnormality also in the second communication unit 14 (YES in Step ST33), an error response is given (Step ST39) since transmission cannot be carried out.

Figure 6:
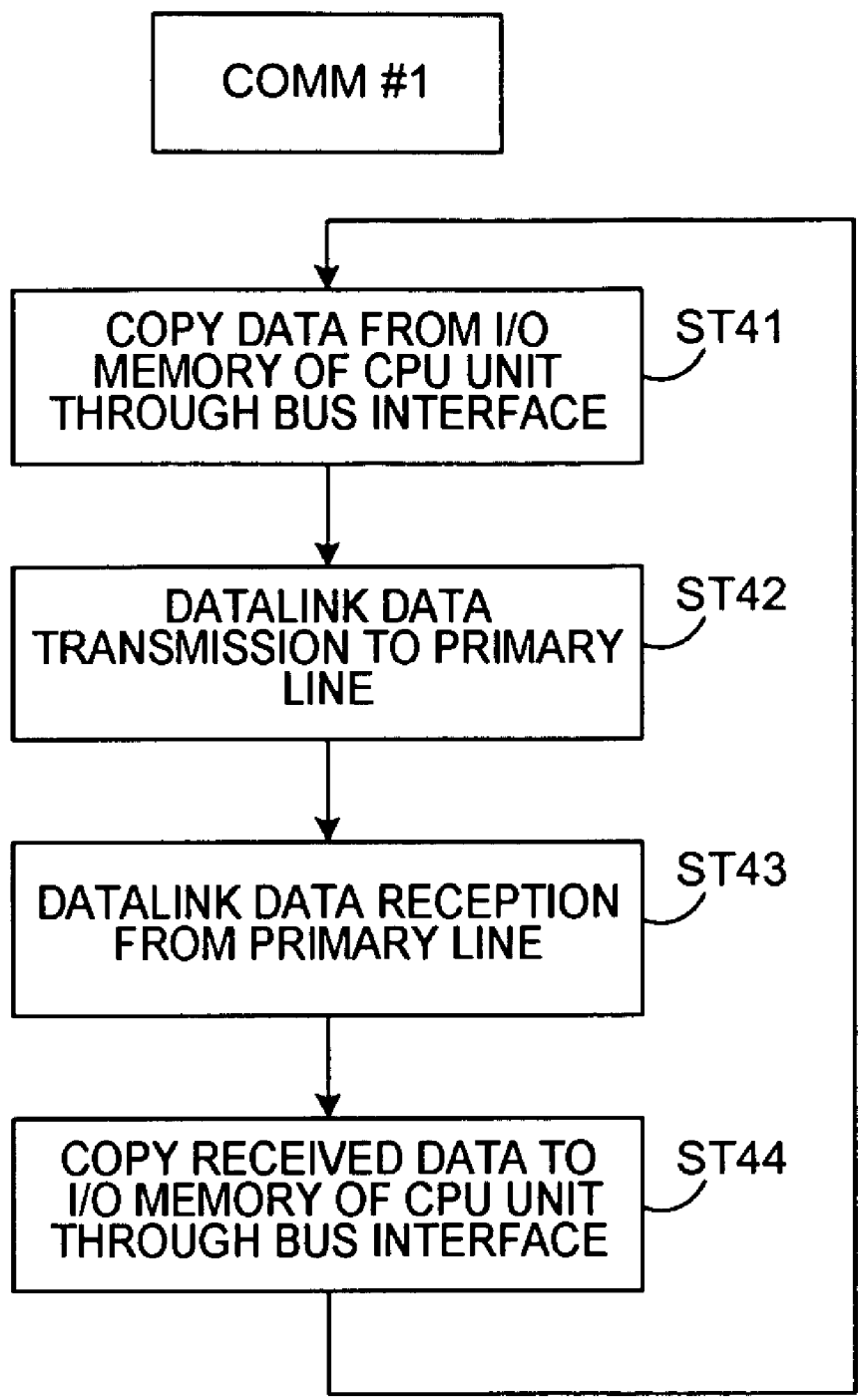
FIG. 6 is a flowchart of the datalink process function of the first communication unit as a primary communication unit in the case of a network abnormality.

FIG. 6 shows the case of a datalink. The first communication unit 13 extracts (copies) transmission data from an area assigned for datalink on the IO memory 12b of the CPU unit 12 through the bus interface (Step ST41) and carries out datalink data transmission through the primary communication line (the first transmission line 31) (Step ST42).

Next, the datalink data sent from the first communication unit 13 of another node through the primary communication line (the first transmission line 30) are received (Step ST43) and copied to a specified area of the IO memory of the CPU unit 12 through the bus interface. The algorithm then returns to Step ST41 and the next datalink process is carried out.

Figure 7:
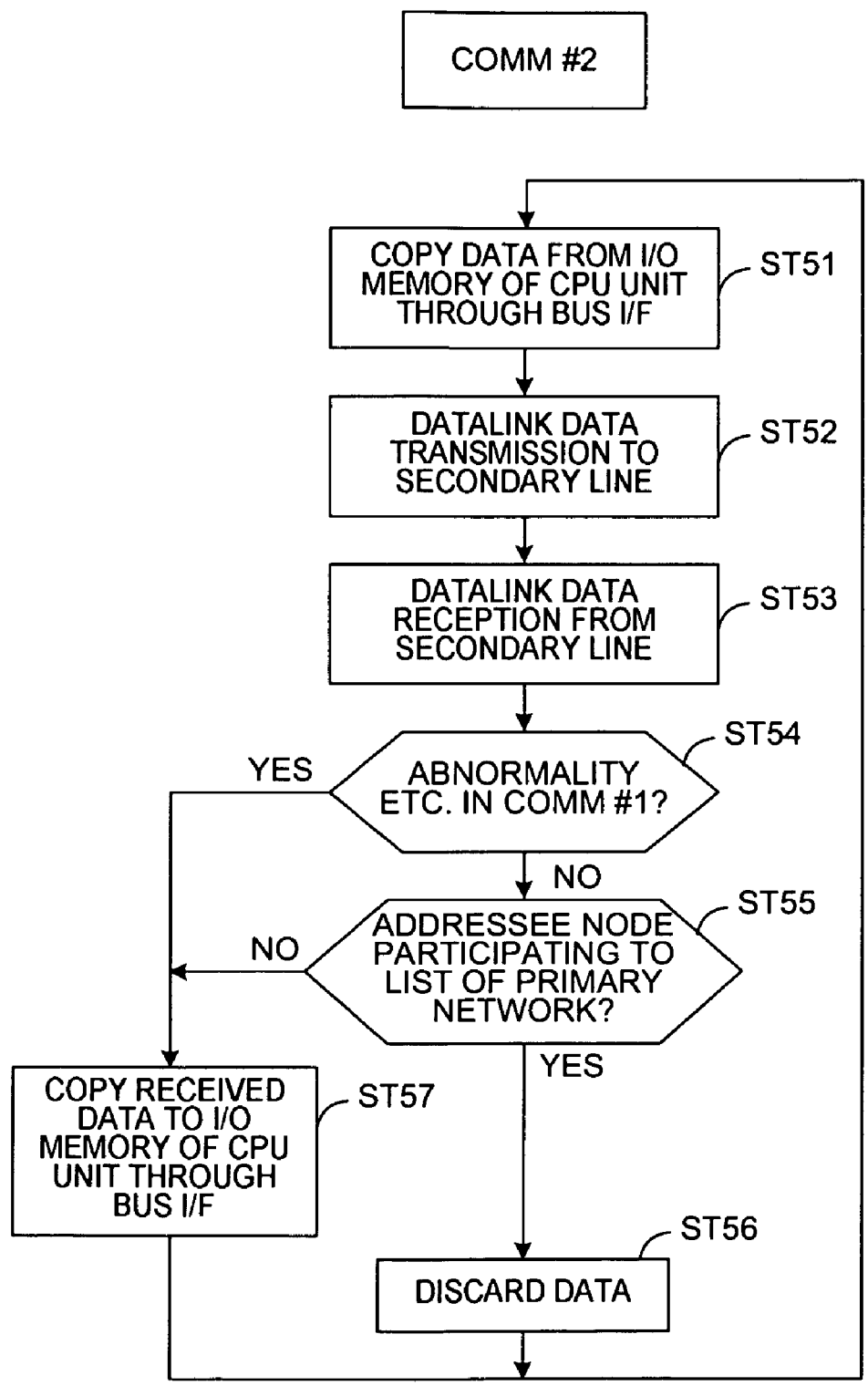
FIG. 7 is a flowchart of the datalink process function of the second communication unit as a secondary communication unit in the case of a network abnormality.

The second communication unit 14 has a different algorithm for carrying out the flowchart shown in FIG. 7 because it is required to take the place of the first communication unit 13 to carry out datalink processing in the case of a network abnormality in the primary network (the first transmission line 30).

Thus, it extracts (copies) transmission data from an area on the IO memory 12b of the CPU unit 12 through the bus interface (Step ST51) and carries out datalink data transmission to the secondary communication line (the second transmission line 31).

Next, the datalink data sent from the second communication unit 14 of another node through the secondary communication line (the second transmission line 31) are received (Step ST53), and it is checked whether or not there is an abnormality, etc. (an abnormality of an online exchange) in the first communication unit 13 (Step ST54). This can be done because the first and second communication units 13 and 14 each have the function of informing the other of any abnormality in itself. This may be done by the CPU unit 12 monitoring the conditions of both the first and second communication units 13 and 14 and informing the abnormality in either of them to the other.

If the first communication unit 13 is functioning normally (NO in Step ST54), it is determined whether the addressee node is participating according to the network participation list of the primary network (Step ST55). If it is participating (YES in Step ST55), this means that the first communication unit 13 is capable of carrying out datalink transmission by using the first communication unit 13 and hence the data received by the second communication unit are discarded (Step ST56). The algorithm thereafter returns to Step ST51 to carry out the next datalink process.

If the first communication unit 13 is in an abnormal condition (YES in Step ST54) or if the addressee node is not participating to the primary network (NO in Step ST55), the datalink data received by the second communication unit 14 are copied at a specified area on the IO memory 12b of the CPU unit 12 through the bus interface (Step ST57). The algorithm thereafter returns to Step ST51 to carry out the next datalink process.

The algorithms explained above with reference to the illustrated flowcharts are not intended to limit the scope of the invention. The processes may be carried alternatively as follows, although no corresponding flowchart is shown.

To start, the first communication unit 13 compares the network participation status of both the primary and secondary networks and selects the one with a better condition. If the first transmission line 30 is found to be in a better condition, the first communication unit 13 is used for datalink communications as in the normal operations. In this case, the second communication units 14 are used only for data transmission and the received data are discarded. If the secondary side is in a better condition, it is communicated to the CPU unit 12 and the second communication units 14 that the interface communication data are to be used and datalink data exchanges are to be carried out through the secondary side. The second transmission units 14, receiving this communication, thereupon carry out the datalink data exchanges. In this case, the first communication units 13 serve only to transmit datalink data and the received data are discarded.

Figure 8:
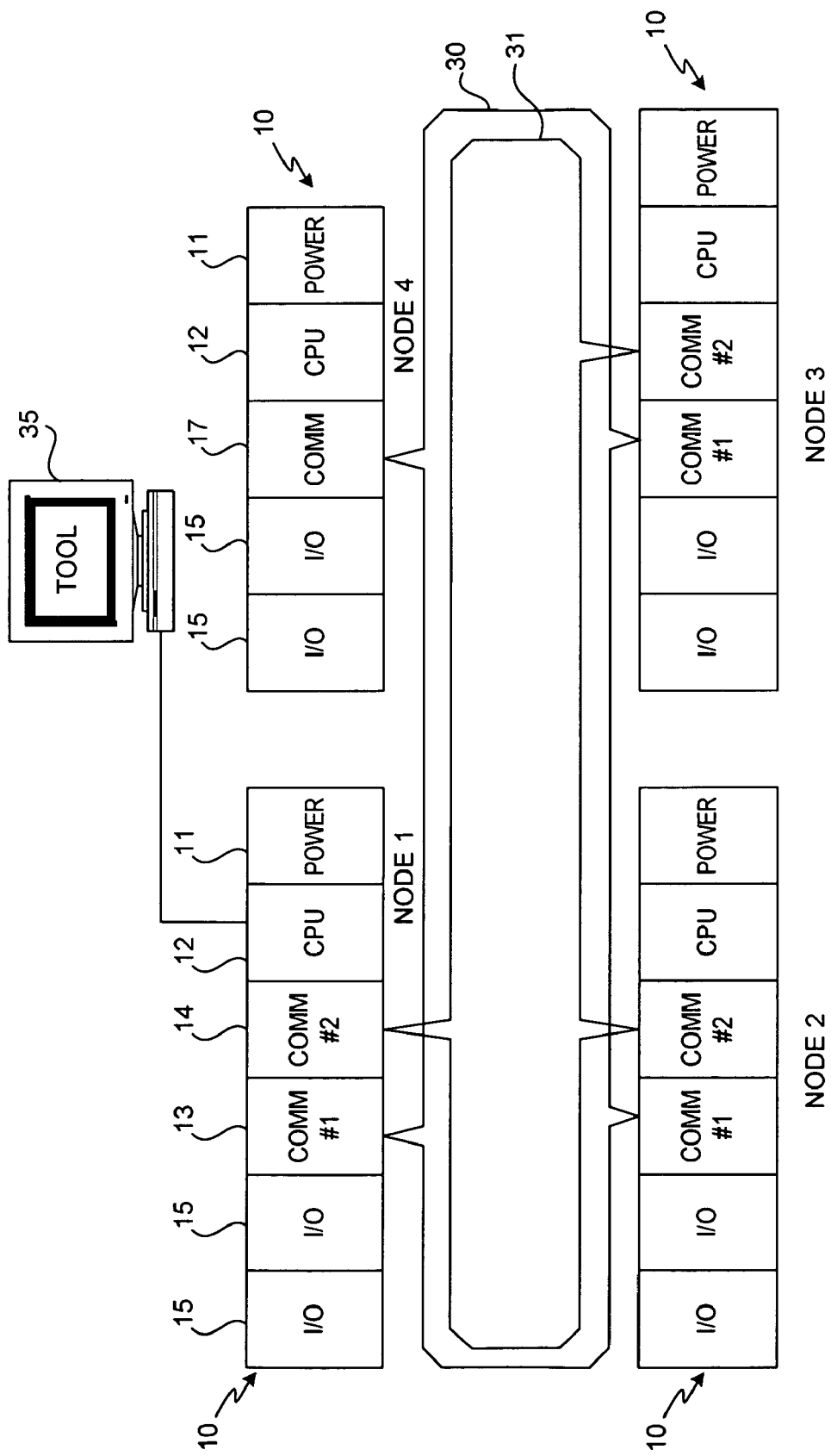
FIG. 8 is a block diagram of another network system embodying this invention.

It is also to be reminded that the invention does not require all of the PLCs connected to a network be provided both with a first communication unit and a second communication unit. As shown in FIG. 8, the network may include a PLC 10' which is not duplexed or devices of other types such as a display device (not shown). In such a case, the device that is not duplexed (such as the communication unit 17 of the PLC 10') is connected to the primary network (the first transmission line 30) like the primary (first) communication units 13 of the duplexed PLCs 10.

What is claimed is:

1. A programmable controller comprising:
a CPU unit;
a primary communication unit connected to a first network; and
a secondary communication unit connected to a second network different from said first network;
said primary communication unit being adapted to compile participation status of nodes connected to said first network;
said CPU unit being adapted to give priority to said primary communication unit when a request to transmit a communication command is issued to said primary communication unit and said secondary communication unit;

said primary communication unit being adapted to judge, when a request to transmit a communication command to an addressee node is received from said CPU unit, whether transmission to said addressee node is possible based on the participation status of said first network, to transmit said communication command if the transmission is judged to be possible and to request said secondary communication unit to transmit said communication command if the transmission is judged to be not possible;

said secondary communication unit being adapted to compile participation status of nodes connected to said second network, to judge, when the request for said transmission is received, whether said transmission is possible to said addressee node based on the participation status of said second network, to transmit said communication command if the transmission is possible, to carry out a specified error process if the transmission is mot possible, and to communicate participation status of nodes connected to said second network to said primary communication unit; and said primary communication unit being adapted to select a network to use for the transmission when said request is received, based on the participation status of said first network and the participation status of said second network.

2. The programmable controller of claim 1 wherein said CPU unit possesses information on whether or not said primary communication unit is in a normal condition and is capable of normal communications and is adapted to issue said request to transmit said communication command to said primary communication unit if said primary communication unit is in a normal condition and to said secondary communication unit if said primary communication unit is not in a normal condition.

3. A duplexed network system comprising a plurality of programmable controllers, a first network and a second network, said programmable controllers each comprising:

a CPU unit;

a primary communication unit connected to one of two different networks; and a secondary communication unit connected to the other of said different networks;

said primary communication unit being adapted to compile participation status of nodes connected to the one of said two different networks;

said CPU unit being adapted to give priority to said primary communication unit when a request to transmit a communication command is issued to said primary communication unit and said secondary communication unit; and said primary communication unit being adapted to judge, when a request to transmit a communication command to an addressee node is received from said CPU unit, whether transmission to said addressee node is possible based on the participation status of the one network connected to said primary communication unit, to transmit said communication command if the transmission is judged to be possible and to request said secondary communication unit to transmit said communication command if the transmission is judged to be not possible;

said secondary communication unit being adapted to compile participation status of nodes connected to said second network, to judge, when the request for said transmission is received, whether said transmission is possible to said addressee node based on the participation status of said second network, to transmit said communication command if the transmission is possible, to carry out a specified error process if the transmission is not possible, and to communicate participation status of nodes connected to said second network to said primary communication unit; and said primary communication unit being adapted to select a network to use for the transmission when said request is received, based on the participation status of said first network and the participation status of said second network.

4. The duplexed network system of claim 3 wherein the primary communication units of all of said programmable controllers are connected to a first network and the secondary communication units of all of said programmable controllers are connected to a second network different from said first network.

5. The duplexed network system of claim 4 wherein said first network connects to devices that are not duplexed.

6. A method of operating a programmable controller including a CPU unit, a primary communication unit and a secondary communication unit; said method comprising the steps of:

connecting said primary communication unit to a first network;

connecting said secondary communication unit to a second network which is different from said first network;

causing said primary communication unit to compile participation status of nodes connected to said first network;

programming said CPU unit such that priority is given to said primary communication unit when a request to transmit a communication command is issued to said primary communication unit and said secondary communication unit;

causing said primary communication unit to judge, when a request to transmit a communication command to an addressee node is received from said CPU unit, whether transmission to said addressee node is possible based on the participation status of said first network, to transmit said communication command if the transmission is judged to be possible and to request said secondary communication unit to transmit said communication command if the transmission is judged to be not possible;

causing said secondary communication unit to compile participation status of nodes connected to said second network, to judge, when the request for said transmission is received, whether said transmission is possible to said addressee node based on the participation status of said second network, to transmit said communication command if the transmission is possible, to carry out a specified error process if the transmission is not possible, and to communicate participation status of nodes connected to said second network to said primary communication unit; and causing said primary communication unit to select a network to use for the transmission when said request is received, based on the participation status of said first network and the participation status of said second network.

* * * * *